Jan. 30, 1968  J. B. EDWARDS ET AL  3,366,352
AERODYNAMIC STRUCTURES AND THEIR MANUFACTURE
Filed Jan. 27, 1966  3 Sheets-Sheet 1
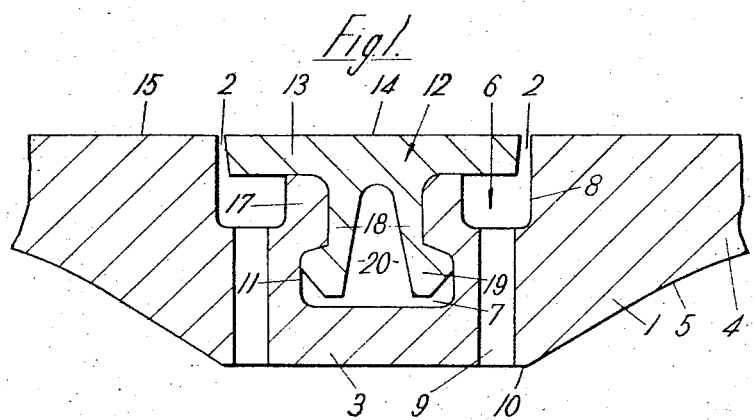
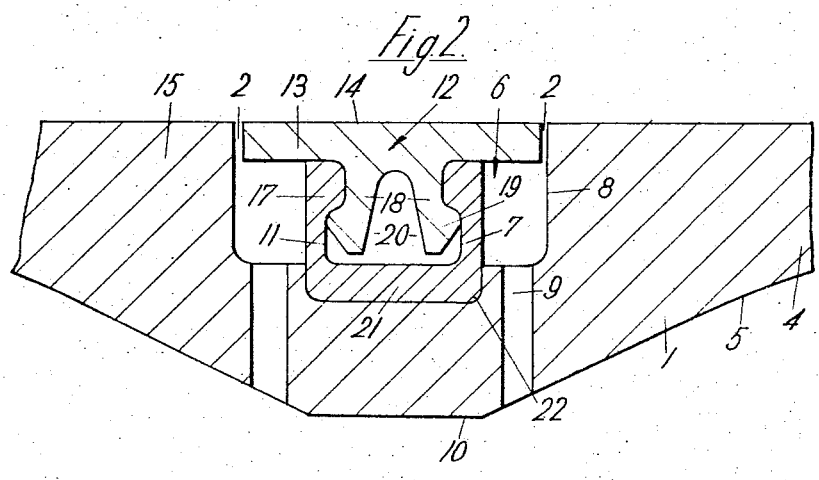
Inventor
JOSEPH B. EDWARDS
ALAN A. BLYTHE

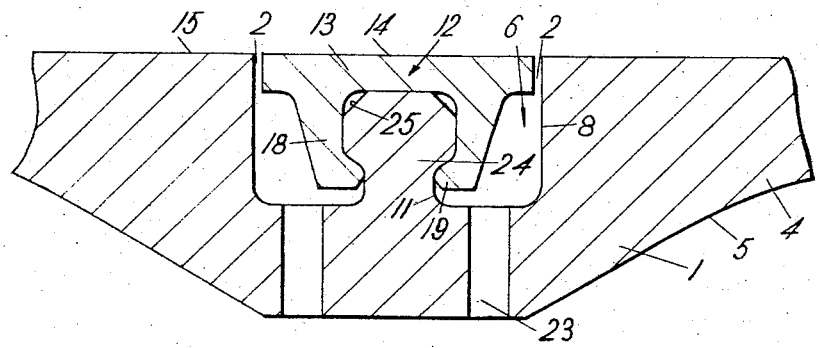
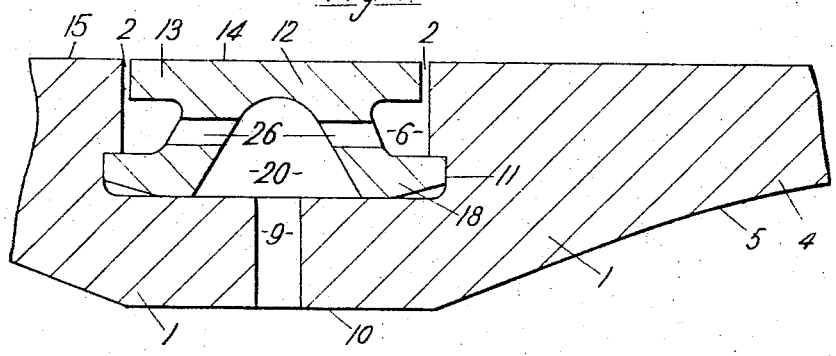

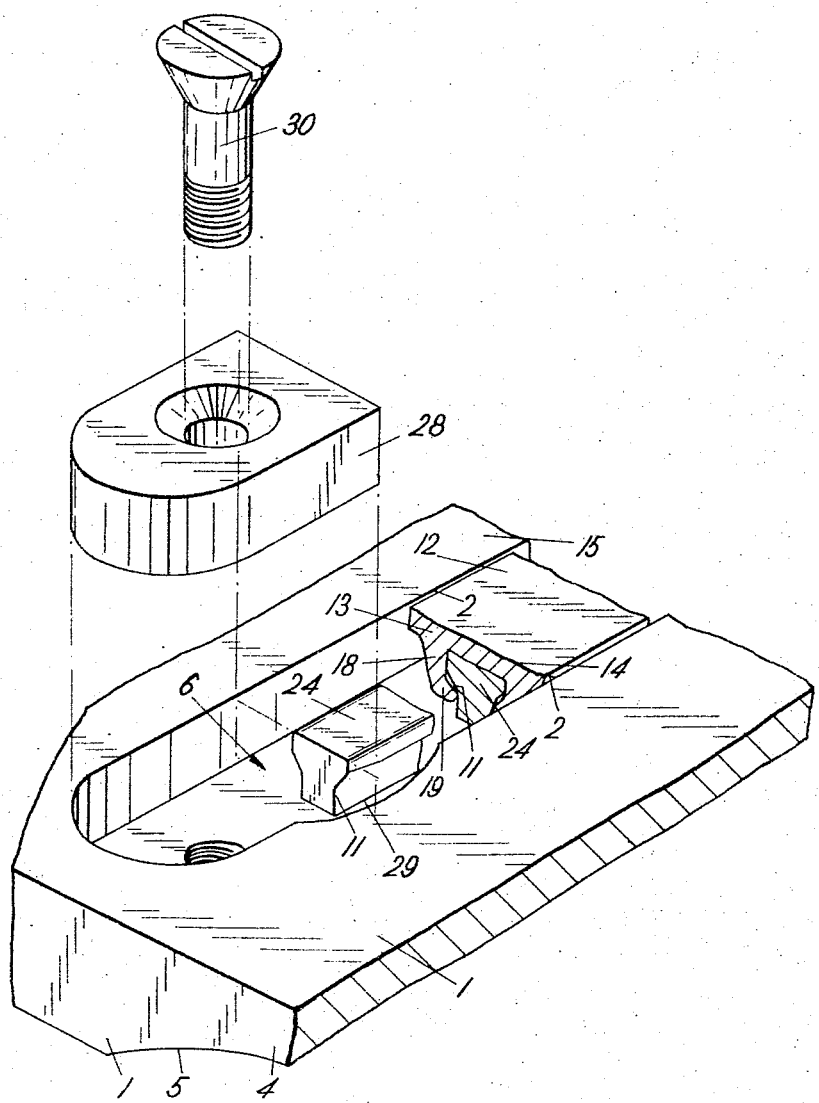

United States Patent Office 3,366,352
Patented Jan. 30, 1968

3,366,352
AERODYNAMIC STRUCTURES AND THEIR MANUFACTURE
Joseph Brien Edwards, London, and Alan Avery Blythe, St. Albans, England, assignors to Handley Page Limited, London, England, a corporation of Great Britain
Filed Jan. 27, 1966, Ser. No. 523,369
Claims priority, application Great Britain, Jan. 27, 1965, 3,638/65
11 Claims. (Cl. 244—130)

ABSTRACT OF THE DISCLOSURE

An aerodynamic structure, and method of making same, having boundary layer control means in which an elongated slot is formed in the outer surface of a structural skin, the slot having formed therein spaced apertures extending from the slot to the inner side of the skin; undercut surfaces are provided in the slot, an elongated substantially rigid element is inserted in the slot and is shaped on its outer surface to complete the contour to the outer skin surface, leaving slits between the sides of the slot mouth and the contiguous edges of the element so that the apertures are in communication with the slits.

---

This invention relates to aerodynamic structures and more particularly to aerodynamic structures such as aircraft wings and fuselages provided with means for controlling the boundary flow of the ambient air thereover with the object of minimising or eliminating turbulence in this layer and producing laminar flow of the air over the surfaces as during flight of an aircraft.

The control of the boundary layer is effected by forming the outer wall of the structure from an outer skin secured to structural elements, and providing small apertures in the skin in communication with cavities within the structure in turn connected through ducts in structural elements to a source of reduced pressure, the assembly including porous elements through which the reduced pressure is applied to the outer surface of the outer skin: by applying suction to the apertures in the skin, boundary layer air is drawn into the structure so that the boundary layer is controlled into laminar flow over the outer surface of the structure.

In one form of such a structure boundary layer control is provided in which the apertures in the outer skin are elongated slits extending spanwise and separated chordwise of an aircraft wing for example. These slits are formed by cutting through the outer skin before it is secured to the structural elements and then fixing the outer skin to the structural elements with the two portions of the cut skin disposed with the cut edges spaced apart by a distance equal to the width of the desired slit e.g. 0.005 inch. The structural elements form the ducts by which suction is applied and the outer skin is, in some forms of construction, secured to a structural skin in turn secured to said elements, the structural skin having a cavity in the form of a groove running along under each outer skin slit and having holes in its base communicating with the ducts in the structural elements. The structural elements may be corrugated sheets or other structure having the ducts therethrough.

In manufacturing such known aerodynamic structures small particles of filings of the materials, or of the adhesive used in securing them together, may become lodged in the apertures or in the grooves or may be left within the structure so that they are dislodged by the action of the suction and clog the groove or apertures or reduce the cross section of the air flow passages through which the suction is applied thereby reducing the effective control of the boundary layer. Once the aerodynamic structure is assembled and the various parts thereof are secured together, it is difficult to detect the presence of any such small particles and it is difficult or even impossible to remove them without damaging the structure.

The main object of the present invention is to provide an aerodynamic structure such as an aircraft wing in which the aforesaid disadvantages are minimised or eliminated.

According to the present invention a method of making an aerodynamic structure provided with boundary layer flow control means comprises forming in the outer face of a structural skin an elongated slot with spaced apertures extending therefrom to the inner side of the skin, providing undercut surfaces within the slot, and inserting an elongated substantially rigid element into the slot generally to complete the contour of the outer surface of the skin and leave slits between the sides of the slot mouth and the contiguous edges of the element, the element having a portion extending into the slot and shaped to engage said undercut surfaces to secure the element in position in the slot while providing air flow paths through the slits to the said apertures whereby suction may be applied therethrough to the boundary layer on the outer surface of the skin.

From another aspect of the invention an aerodynamic structure provided with boundary layer flow control means comprises an outer structural skin, an elongated slot in the outer face of the skin, apertures extending through the skin from the slot to the inner face of the skin, undercut surfaces within the slot, and an elongated, and maybe pliable, substantially rigid element disposed in the slot, the element having an outer surface shaped to complete the outer contour of the skin with its edges spaced from the contiguous edges of the slot to form suction slits and having a portion within the slot shaped to engage said undercut surfaces to secure the element in position in the slot while providing air flow paths through the slits to said apertures whereby suction may be applied therethrough to the boundary layer on the outer surface of the skin.

Preferably the sides of the slot and/or the continguous edges of the element are inclined to the normal through the skin so that the slits taper with increasing width away from the outer surface of the skin.

In one preferred construction the slot is generally T-shaped in cross section, with the undercut surfaces in the opposite sides of the stem of the T, and under the arms of the T cavities are provided beneath the slits and apertures extend from the cavities to the inner face of the skin, the elongated element also being T-shaped with the arms of the T completing the outer contour of the skin with the slits along its longitudinal edges and the stem of the T having projecting portions shaped to engage in undercut surfaces to hold the element in position.

In another preferred construction the slot is provided with two rows of spaced apertures extending therefrom to the inner face of the skin and between the rows is disposed a pair of elongated members having undercut faces, and the elongated element has an outer skin contour completing portion with the slits between its edges and the slot in communication with said rows of apertures and a portion extending into the slot between said elongated members with projecting portions engaging said undercut portions to hold the element in position.

In both these preferred constructions the elongated members may be interconnected by an elongated base member which is secured to the base of the slot between the rows of apertures.

In a third preferred construction the slot is channel shaped in cross section with the undercut surfaces formed in opposite sides of the channel, and the elongated element has a portion extending into the channel with outwardly extending portions shaped to engage in said undercut surfaces to hold the element in position, apertures being provided through the elongated element in communication with the slits and with the apertures extending to the inner face of the skin to complete the air flow paths through the structure.

In all these constructions the portion of the elongated element extending into the slot is hollow to permit flexing of the portions engaging in the undercut surfaces to facilitate their engagement with said surfaces.

In yet another preferred construction the slot is channel shaped in cross section with a substantially central upstanding portion of less height than the slot depth with the undercut surfaces along its sides, and the elongated element has two spaced portions extending into the slot with inwardly projecting portions engaging said undercut surfaces, the apertures in the skin opening into cavities beneath the slits between the sides of the slot and the elongated element.

In order that the invention may be more fully understood some embodiments in accordance therewith will now be described by way of example with reference to the accompanying drawings in which:

FIG. 1 is a cross section through an aerodynamic structure;

FIG. 2 is a cross section through a second aerodynamic structure;

FIG. 3 is a cross section through a third aerodynamic structure;

FIG. 4 is a cross section through a fourth aerodynamic structure; and

FIG. 5 is an exploded prospective view of yet another construction;

In the drawings the same references are used to designate the same or similar parts and in each figure only a part of the structure is shown. The figures are on a greatly enlarged scale compared with the sizes of the parts in practice.

Referring to FIG. 1 this shows part of the outer structural skin 1 forming the outer wall, of the aerodynamic structure, which is secured to structural elements of the wall having ducts therein subjected to reduced pressure for the purpose to be described. The structure may be the wing of an aircraft or other part of the craft such as the fuselage, the slits 2 to be described extending spanwise of a wing for example so that the boundary layer flow of the ambient air will, in flight of the aircraft, flow across the slits.

The skin 1 has a thickened portion 3 merging into the thinner portions 4 by non-abrupt curves 5 since at these points the stresses in the skin are high. In the portion 3 there is a slot 6 having a central portion 7 deeper than the side portions 8. The portions 8 are recessed to form cavities which may run over a substantial part of the length of the slot, or may be a number of spaced cavities. From the base of each cavity there are a number of apertures 9 extending through the skin to its inner face 10 where they communicate with a duct or ducts subjected to reduced pressure. The deeper part 7 has on opposing faces undercut surfaces 11.

Within the slot is an elongated element 12 having a portion 13 the upper surface 14 of which is shaped to complete the contour of the outer surface 15 of the skin so as to avoid any turbulence in the boundary layer flowing over the structure. The edges of the portion 13 are spaced from the edges 16 of the slot to form therewith the slits 2 which communicate with the cavities. As seen in FIG. 1 the sides of the portion 13 and/or the sides of the slot, are inclined to the normal through the skin 1 so that the slits widen away from the outer surface of the skin. A suitable taper is 3°–5° to the normal, the object of the taper being to minimise the lodgement of particles in the slits 2.

The skin 1 is of metal, normally aluminium or a light metal alloy, and the element 12 may be of metal or a rigid synthetic plastic such as nylon. The element 12 must be pliable to enable it to be inserted into the slot but sufficiently rigid to withstand the loads on it in flight and to ensure its being secured in the slot as will be described.

The portion 13 of the element 12 has a thickness equal to the difference in the depth of the slot and the height of the portion 17 bounding the deeper portion 7 of the slot so that the portion 13 has a snug fit on the tops of the portions 17. The element 12 has a portion 18 extending into the portion 7 and at its lower end it has sidewardly extending portions 19 shaped to engage as a snug fit into the undercut surfaces 11. Thus the element 12 can be inserted into the slot so that the portions 19 engage in the surfaces 11, and then it is eased along its length down into the slot. The bottom of the element 12 between the portions 19 may be hollow, as seen at 20, to enable the portions 19 to flex sufficiently to snap into the undercut surfaces. A squeezing tool may be used to press the portions together and by running it along the element 12 it will facilitate engagement of the element snugly into the slot.

The element 12 is thus firmly held in the slot by, but it may be secured by adhesives, bolts or other known means such as rivets.

Referring to FIG. 2, this is similar in use to that described with reference to FIG. 1 but the portions 17 are made separately from the skin, which is formed with a channel or U-shaped slot 6, and secured thereon by suitable means. The portions 17 may be as shown interconnected by an elongated base member 21 which is secured to the base of the slot, and may be shaped to be a snug fit into a hollow 22 in the base of the slot.

Referring to FIG. 3, this shows a channel or U-shaped slot 6 with rows of spaced apertures 23 and and between the rows is an elongated upstanding member 24, which may be formed separately from the skin 1, having the undercut surfaces 11 on its sides, the element 12 having its sidewardly extending portions 19 one on the inner face of each of two portions 18 which engage the surfaces 11 snugly. The upper edges 25 of the member 24 may be chamfered as shown to facilitate passage of the portions 19 thereover.

Referring to FIG. 4, the slot 6 is a simple channel or U-shaped cross section with the undercut surfaces 11 in its sides, while the element 12 has outwardly extending portions 18 engaging in the undercut surfaces. The element 12 has the hollow lower central portion 20, into which apertures 26 open, and the air flow path through the structure is thus completed by the apertures 26 in the portions 18 of the element 12 and through the single row of apertures 9 extending from the portion 20 to the inner face of the skin.

In all the preferred constructions the slits are about 0.005 inch wide, the slot mouth is about 0.22 inch wide, the undercut portions are about 0.015 inch deep, the slot is about 0.10 inch deep and the apertures extending to the inner skin face are about 0.03 inch diameter. In FIG. 4 the apertures are about 0.015–0.02 inch diameter.

Alternatively where the element 12 has a central cut away portion 20, it may be formed initially so as to drop freely into the slot and thereafter be deformed so that the portions 19 engage the surfaces 11 as by a mandrel drawn through the portion 20, the element 12 being held down in the slot. In a construction such as FIG. 3 the mandrel would be drawn through the cavities 6 to force the portions 19 towards each other and into engagement with the surfaces 11.

In a modification, if it is found that the suction of the air of the boundary layer into the slit or both the slits alongside each element 12, tends to create a wave in the outer boundary layer of airflow over the structure, the edge of the slit, either on the outer skin surface and/or on the edge of the element 12 may be raised or depressed as by the width of the slit for example to counteract this tendency and ensure stabilisation of the boundary layer flow.

It will be seen that by means of the said construction all the parts are easily cleaned of all particles prior to assembly, or the strip element 12 can be temporarily removed and replaced after cleaning since adhesives are not essential there is no risk of adhesive particles being present within the assembled parts. Also great accuracy can be achieved with the parts and in particular the slits and apertures forming the air flow path. The strip elements 12 can be removed for inspection of the skin within the slots to assist in detecting any faults, as due to fatigue, which might arise during the life of the structure. Moreover the diameter of the holes 26 in FIG. 4 may be increased or new strip elements 12 with smaller diameter holes 26 may be inserted. Moreover the elements 12 can be easily extracted and replaced at any time; and if the slot 12 is damaged it can be enlarged by a simple machining operation and then a large size strip element 12 will be employed. If the slit width is to be changed the strip element 12 can be removed and a strip of larger or smaller width inserted. The elements 12 at their ends are made to be a snug fit with the contiguous ends of the slots or adjoining elements 12 in the same slots: small cavities or removable screws may be used at the ends and/or in the length of the elements 12 to enable a tool to be inserted to aid in quick removal of the elements from the slots. Moreover it will be seen that the construction enables the slits 2 to be made in pairs of closely disposed preferably parallel slits and these can be arranged as straight slits or may be curved throughout their length.

Referring to FIG. 5 this shows an alternative construction showing the slot 6 with the upstanding member 24 as in FIG. 3. The member 24 stops short of the slot end and the element 12 is made as a plurality of short elements which can be dropped into the slot and slid along the element 24; sufficient short elements are disposed in end to end engagement on the member 24 to fill the slot 6. The end of the member 24 may be chamfered as at 29 to facilitate the movement of the elements into it. The final gap is closed by a closure piece 28 which is held in place by a screw 30 thereby facilitating assembly or dismounting of the elements in the slot. The elements may be rigid, e.g. of metal, or the other materials described herein.

We claim:

1. A method of making an aerodynamic structure having boundary layer control means including the steps of forming in the outer surface of a structural skin an elongated slot, forming in the slot spaced apertures extending from the slot to the inner side of the skin, providing undercut surfaces within the slot, inserting into the slot an elongated substantially rigid element shaped on its outer surface to complete the contour of the outer surface of the skin and to leave slits between the sides of the slot mouth and the contiguous edges of the element and shaped to extend into the slot and engage said undercut surfaces leaving said apertures in communication with said slits.

2. An aerodynamic structure having boundary layer control means, comprising an outer structural skin, an elongated slot in the outer face of the skin, apertures extending through the skin from the slot to the inner face of the skin, undercut surfaces within the slot, and an elongated element of substantially rigid material disposed in said slot, said element having an outer surface completing the outer contour of the skin, a transverse dimension less than the slot width having slits between the longitudinal edges of said slot and said skin, a portion extending into said slot having enlarged portions engaging said undercut slot portions, and said slits in direct communication with said apertures.

3. An aerodynamic structure according to claim 2 wherein the edges of at least one of said slot and said element are inclined to the normal through said skin forming tapering slits increasing in width away from said outer skin surface.

4. An aerodynamic structure according to claim 2 wherein said slot is generally T-shaped in cross section with said undercut portions on opposite sides of the stem of the T, cavities beneath the arms of said T, the arms of said T being of less width than said slot, said apertures communicating with said cavities, and projecting portions on the stem of said T engaged and secured in said undercut portions.

5. An aerodynamic structure according to claim 2 wherein said spaced apertures are disposed in two spaced rows each extending longitudinally of said slot, a pair of spaced elongated elements disposed longitudinally of said slot between said rows, undercut faces on said members, and said elongated member secured in said slot with longitudinal projections engaged in said undercut portions.

6. An aerodynamic structure according to claim 5 wherein an elongated base member is secured to the base of said slot between the said rows.

7. An aerodynamic structure according to claim 2 wherein said slot is of channel shaped cross section, said undercut surfaces are disposed in opposite sides of said channel section, said portion of said elongated element extending into said channel section has outwardly projecting portions engaged in said undercut surfaces, cavities in said channel section between the longitudinal walls of said slot and said undercut surfaces, and said apertures and said slits open into said cavities.

8. An aerodynamic structure according to claim 2 wherein said slot is of channel shaped cross section, a deeper longitudinal channel in the base of said channel section, an elongated U-shaped element secured by its base in said deeper channel, undercut surfaces in the arms of said U-shaped element, projections on the portion of said elongated element engaged in said undercut surfaces, and cavities between the walls of said slot and said U-shaped element, said cavities communicating with said slits and said apertures.

9. An aerodynamic structure according to claim 2 wherein the portion of said elongated element in said slot is hollow to permit the portions thereof having said projections to flex for engagement in said undercut surfaces.

10. An aerodynamic structure according to claim 2 wherein said slot is of channel shaped cross section, an elongated upstanding portion of less height than the depth of said slot disposed substantially centrally of said slot, undercut surfaces along the sides of said upstanding portion, said portion of said elongated element extending into said slot comprising two substantially parallel spaced elements having inwardly directed projections engaged in said undercut surfaces, and cavities between the walls of said slot and said spaced elements, said cavities communicating with said slits and said apertures.

11. An aerodynamic structure according to claim 2 wherein said apertures are disposed in spaced rows extending longitudinally of said slot, and an elongated base member is secured to the base of said slot between the said rows.

References Cited

UNITED STATES PATENTS

| | | | |
|---|---|---|---|
| 2,146,768 | 2/1939 | Schmidt | 244—132 |
| 2,925,231 | 2/1960 | Pfaff et al. | 244—42 |

FERGUS S. MIDDLETON, *Primary Examiner.*

MILTON BUCHLER, *Examiner.*

B. BELKIN, *Assistant Examiner.*

UNITED STATES PATENT OFFICE
CERTIFICATE OF CORRECTION

Patent No. 3,366,352                       January 30, 1968

Joseph Brian Edwards et al.

It is hereby certified that error appears in the above numbered patent requiring correction and that the said Letters Patent should read as corrected below.

In the heading to the printed specification, line 4, for "Joseph Brien Edwards" read -- Joseph Brian Edwards --.

Signed and sealed this 1st day of April 1969.

(SEAL)
Attest:

Edward M. Fletcher, Jr.                          EDWARD J. BRENNER
Attesting Officer                               Commissioner of Patents